Oct. 7, 1958  F. K. H. NALLINGER  2,854,821
ARRANGEMENT FOR REPLACING LEAKAGE FLUID
IN HYDRAULIC BRAKE SYSTEMS
Filed Sept. 24, 1953
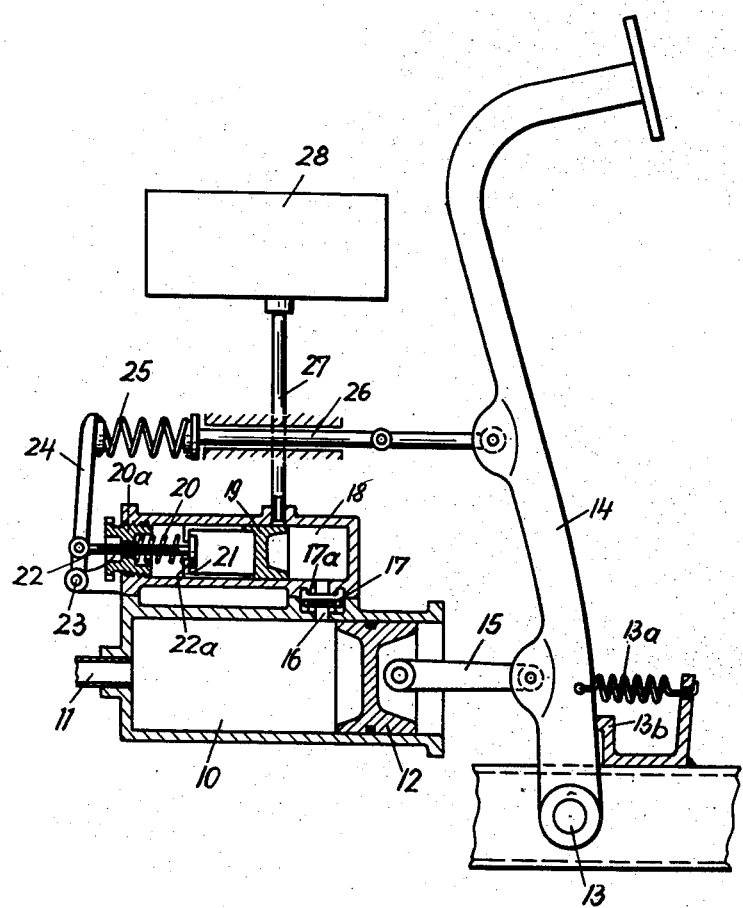
INVENTOR
FRIEDRICH K.H. NALLINGER.
BY Dicke and Craig.
ATTORNEYS.

United States Patent Office 2,854,821
Patented Oct. 7, 1958

2,854,821

ARRANGEMENT FOR REPLACING LEAKAGE FLUID IN HYDRAULIC BRAKE SYSTEMS

Friedrich K. H. Nallinger, Stuttgart, Germany, assignor to Daimler-Benz Aktiengesellschaft, Stuttgart-Unterturkheim, Germany Application September 24, 1953, Serial No. 382,158

7 Claims. (Cl. 60—54.6)

This invention relates to a hydraulic brake system, and more particularly to the kind used in motor vehicles in which the cylinder of the piston which originates the braking pressure, i. e., the master cylinder, is in communication with a supply tank for replacing the brake fluid.

The construction of the master cylinder in use at the present time has the disadvantage that owing to the passageway between master cylinder and supply tank a lost travel takes place at the beginning of the actuating stroke which is a dead loss to the total available travel of the brake pedal.

It is an object of the present invention to eliminate this lost travel and to produce an initial pressure within the master cylinder.

A further object of the present invention is the provision of such an arrangement that an initial pressure is simultaneously exerted upon the entire brake system including the brake working mechanism.

A feature of the invention accordingly consists in that the master cylinder is kept under initial or static pressure when the brake is inoperative. To this end a fluid replacing cylinder is especially interposed between master cylinder and supply tank and is provided with a spring loaded fluid replacing piston which suitably controls the connection between master cylinder and supply tank, the cylinder of the fluid-replacing cylinder being in communication with the master cylinder by means of a check valve. According to another feature of the present invention, the piston of the fluid replacing cylinder is connected to the brake operating member as, for example, a brake pedal, in particular in such a non-positive manner that the fluid-replacing piston performs a suction stroke, when the brake is operated, thereby drawing brake fluid into the fluid replacement tank by opening a connection between fluid replacing cylinder and supply tank.

More specific objects of the invention are set forth in the following specification, which describes one embodiment of the invention by way of example and with reference to the accompanying drawing.

In the construction illustrated in the drawing, the numeral 10 indicates a master cylinder which through a line 11 is in communication with one or more brake operating wheel-cylinders and provided with a sliding piston 12. The latter is coupled by means of a connecting rod 15 to the brake pedal 14 which is supported at 13 and in its position of rest is urged agaisnt a stop 13b by means of a spring 13a.

Branching off from the master cylinder 10 is a bore or line 16 in which a light moving check valve 17 is located, which in the illustrated position opens the line 16, yet closes it when the valve 17 is seated on the seat 17a. This line leads to the fluid-replacing cylinder 18 in which the fluid-replacing piston 19 slides. The latter is under the tension of a spring 20 which tries to urge it to the right, and is by means of a stop 21 and a counter stop 22a of a rod 22 non-positively connected to the rod 22 by said spring 20. The initial tension of the spring 20 can be regulated by a threaded member 20a. The rod 22 is linked to a drag lever 24 which is pivotally supported at 23 and abuts against a rod 26, linked to the brake pedal 14, by the action of a spring 25 under initial tension.

In addition, a supply tank 28 is in communication with the fluid replacing cylinder 18 through a passageway 27 which is controlled by the piston 19.

The principle of operation of the illustrated arrangement is as follows:

When the piston 12 in the master cylinder 10 is moved to the left from its illustrated position upon depression of the brake pedal 14, the valve 17, located within the connection 16 between master cylinder 10 and fluid replacing cylinder 18, will immediately be closed so that no dead travel will ensue. At the same time the brake fluid is forced out of the master cylinder 10 and through the line 11 into the wheel-cylinders, whereby the brakes are brought into engagement.

Simultaneously with the displacement of the piston 12, the drag lever 24 is swung by means of the rod 26 and spring 25, thereby moving the piston 19 to the left against the action of the spring 20. Thus the passage way 27 to the supply tank 28 will be released and brake fluid will be drawn from the supply tank into the fluid replacement cylinder 18. When the brake pedal 14 and therewith the piston 12 is thereupon permitted to return into the position illustrated on the drawing, then, on the one hand, movement of piston 12 will draw back brake fluid into the master cylinder 10 from the actuating or secondary cylinders in the brake system, while, on the other hand, the loss of fluid as a result of leakage will be replaced from the fluid replacing cylinder 18 in that the piston 19, upon release of the drag lever 24, is forced to the right by the action of the spring 20. Communication with the supply tank is cut off and the brake fluid within the fluid replacing cylinder as well as that within the master cylinder and the brake system is put under initial pressure, the magnitude of which being determined by the tension of the spring 20.

The specification and drawing do not attempt to give a survey of possible modifications of the invention, and a modification of the example described is therefore not necessarily a departure from the principle of the invention.

What is claimed is:

1. A hydraulic brake system with brake-actuating means comprising, a cylinder connected to said brake-actuating means, a first piston within said cylinder, a brake-operating member, means connecting the brake-operating member with said first piston to provide a reciprocating motion of said first piston within said cylinder upon displacement of said brake-operating member, a second cylinder filled with fluid, a second piston within said second cylinder, first resilient means for placing said second piston under spring tension and for holding the fluid within said second cylinder at a certain pressure, means including a linkage and second resilient means for displacing said second piston against said spring tension, a single fluid passage leading from said second to said first cylinder to place said two cylinders in communication with each other, said passage being arranged in said first cylinder at a point substantially next to said first piston with said brake-operating member in its position of rest and said brake-actuating means inoperative, said fluid line putting the fluid within said first cylinder under the pressure of the fluid within said second cylinder, and check valve means in said fluid line near said first cylinder operative to enable flow in the direction from said second cylinder to said first cylinder and to disable flow in the opposite direction from said first cylinder to said second cylinder as soon as said first piston is displaced upon displacement of said brake-operating member.

2. A hydraulic brake system with brake-actuating means comprising, a cylinder connected to said brake-actuating means, a first piston within said cylinder, a brake-operating member, means connecting said brake-operating member with said first piston to provide a reciprocating motion of said first piston within said cylinder upon displacement of said brake-operating member, a second cylinder filled with fluid, a second piston within said second cylinder, first resilient means for putting said second piston under spring tension to thereby hold the fluid within said second cylinder at a certain pressure, a single fluid passage leading from said second to said first cylinder to place said two cylinders in communication with each other, said fluid passage terminating in said first cylinder at a point substantially next to said first piston with said brake-operating member in its position of rest and said brake-actuating means inoperative, said fluid passage putting the fluid within said first cylinder under the pressure of the fluid within said second cylinder, check valve means for cutting off the communication through said fluid passage from said first to said second cylinder as soon as said first piston is displaced upon displacement of said brake-operating member, a fluid reservoir, a fluid line leading from said fluid reservoir to said second cylinder, and means for displacing said second piston against said spring tension, said fluid line terminating in said second cylinder in a portion thereof to control its discharge area directly by said second piston so as to interrupt the communication through said fluid line with said second piston in its position of rest, yet provide a communication with said second piston displaced against said spring tension, said means for displacing said second piston being connected with said brake-operating member through a linkage including resilient means to displace said second piston against said spring tension upon actuation of said brake-operating member in the direction of actuation of said actuating means.

3. A hydraulic brake system with brake-actuating means comprising, a cylinder connected to said brake-actuating means, a first piston within said cylinder, a brake-operating member, means connecting said brake-operating member with said first piston to provide a reciprocating motion of said first piston within said cylinder upon displacement of said brake-operating member, a second cylinder filled with fluid, a second piston within said second cylinder, first resilient means for putting said second piston under spring tension to thereby hold the fluid within said second cylinder at a certain pressure, a single fluid passage leading from said second to said first cylinder to place said two cylinders in communication with each other, said passage being arranged in said first cylinder at a point substantially next to said first piston with said brake-operating member in its position of rest and said brake-actuating means inoperative, said fluid line putting the fluid within said first cylinder under the pressure of the fluid within said second cylinder, check valve means for cutting off the communication through said fluid passage from said first to said second cylinder as soon as said first piston is displaced upon displacement of said brake-operating member, a fluid reservoir, a fluid line leading from said fluid reservoir to said second cylinder, means for displacing said second piston against said spring tension, said last-mentioned fluid passage communicating with said second cylinder at a portion thereof to control its passage area directly by said second piston so as to interrupt the communication through said fluid line with said second piston in its position of rest, yet provide a communication with said second piston displaced against said spring tension, wherein said means for displacing said second piston comprises a linkage for connecting said second piston with said brake-operating member including second resilient means inserted between said brake-operating member and said linkage, both said linkage and said second resilient means displacing said second piston against said spring tension of said first resilient means on displacement of said brake-operating member in the sense of brake operation.

4. A hydraulic brake system with brake-actuating means comprising, a cylinder connected to said brake-actuating means, a first piston within said cylinder, a brake-operating member, means connecting said brake-operating member with said first piston to provide a reciprocating motion of said first piston within said cylinder upon displacement of said brake-operating member, a second cylinder filled with fluid, a second piston within said second cylinder, resilient means for putting said second piston under spring tension to thereby hold the fluid within said second cylinder at a certain pressure, a single fluid passage leading from said second to said first cylinder to place said two cylinders in communication with each other, said passage being arranged in said first cylinder at a point substantially next to said first piston with said brake-operating member in its position of rest and said brake-actuating means inoperative, said fluid line putting the fluid within said first cylinder under the pressure of the fluid within said second cylinder, check valve means for cutting off the communication through said fluid passage from said first to said second cylinder as soon as said first piston is displaced upon displacement of said brake-operating member, a fluid reservoir, a fluid line leading from said fluid reservoir to said second cylinder, and means for displacing said second piston against said spring tension, said last-mentioned fluid passage communicating with said second cylinder at a portion thereof to control its passage area directly by said second piston so as to interrupt the communication through said fluid line with said second piston in its position of rest, yet provide a communication with said second piston displaced against the spring tension, wherein said means for displacing said second piston comprise an intermediate lever, a stop on said second piston, a piston rod connecting said second piston with said intermediate lever, said piston rod having a stop cooperating with said stop on said second piston to provide abutment of said two stops against each other under said spring tension yet enable detachment from each other in the opposite direction, and further resilient means between said brake-operating member and said intermediate lever to provide a spring tension by said further resilient means upon said intermediate lever in a direction opposite to the sense in which the latter is swung by said first-mentioned resilient means.

5. The hydraulic brake system according to claim 1, in combination with means for changing the initial tension of said first resilient means in the rest position of said second piston.

6. A hydraulic brake system with brake-actuating means comprising, a cylinder connected to said brake-actuating means, a first piston within said cylinder, a brake-operating member, means connecting the brake-operating member with said first piston to provide a reciprocating motion of said first piston within said cylinder upon displacement of said brake-operating member, a second cylinder filled with fluid, a second piston within said second cylinder, first resilient means for subjecting said second piston under spring tension to thereby hold said fluid within said second cylinder at a certain pressure, a fluid line leading from said second to said first cylinder and terminating therein within the region of the piston stroke slightly ahead of the leading edge of said first piston with said first piston in the rest position so that said two cylinders are in communication with each other only when said brake-operating member is substantially in its rest position and said brake-actuating means is inoperative, said fluid line placing the fluid within said first cylinder under the pressure of the fluid within said second cylinder, a fluid reservoir, a fluid line leading from said fluid reservoir to said second cylinder, and means for displacing said second piston against said spring tension, said means for displacing said second piston comprising a linkage for connecting said second piston with said brake-operating member including second resilient means inserted into said linkage comprising a spring, and both said linkage and said spring displacing said second piston against the spring tension of said first resilient means on displacement of said brake-operating member in the sense of brake operation.

7. A hydraulic brake system with brake-actuating means comprising, a cylinder connected to said brake-actuating means, a first piston within said cylinder, a brake-operating member, means connecting the brake-operating member with said first piston to provide a reciprocating motion of said first piston within said cylinder upon displacement of said brake-operating member, a second cylinder filled with fluid, a second piston within said second cylinder, means including a linkage and spring means interposed into said linkage for connecting said second piston with said brake-operating means, further resilient means for placing said second piston under spring tension to thereby hold the fluid within said second cylinder at a certain pressure, a first fluid line leading from said second to said first cylinder and terminating therein within the region of the piston stroke slightly ahead of the leading edge of said first piston with said first piston in the rest position so that said two cylinders are in communication with each other only when said brake-operating member is substantially in its rest position and said brake-actuating means is inoperative, said first fluid line placing the fluid within said first cylinder under the pressure of the fluid within said second cylinder, a fluid reservoir, a second fluid line leading from said fluid reservoir to said second cylinder, said first fluid line connecting said second cylinder with said first cylinder being directly controlled by said first piston to close said first fluid line by said first piston shortly after said brake-operating member is displaced from its rest position and said first fluid line being again opened only shortly before the brake-operating member returns to its rest position.

References Cited in the file of this patent

UNITED STATES PATENTS

| | | |
|---|---|---|
| 2,156,415 | Weihe | May 2, 1939 |
| 2,217,461 | Weihe | Oct. 8, 1940 |
| 2,298,856 | Bowen | Oct. 13, 1942 |
| 2,501,108 | Wahlberg | Mar. 21, 1950 |

FOREIGN PATENTS

| | | |
|---|---|---|
| 857,113 | France | Apr. 8, 1940 |